Patented Sept. 3, 1940

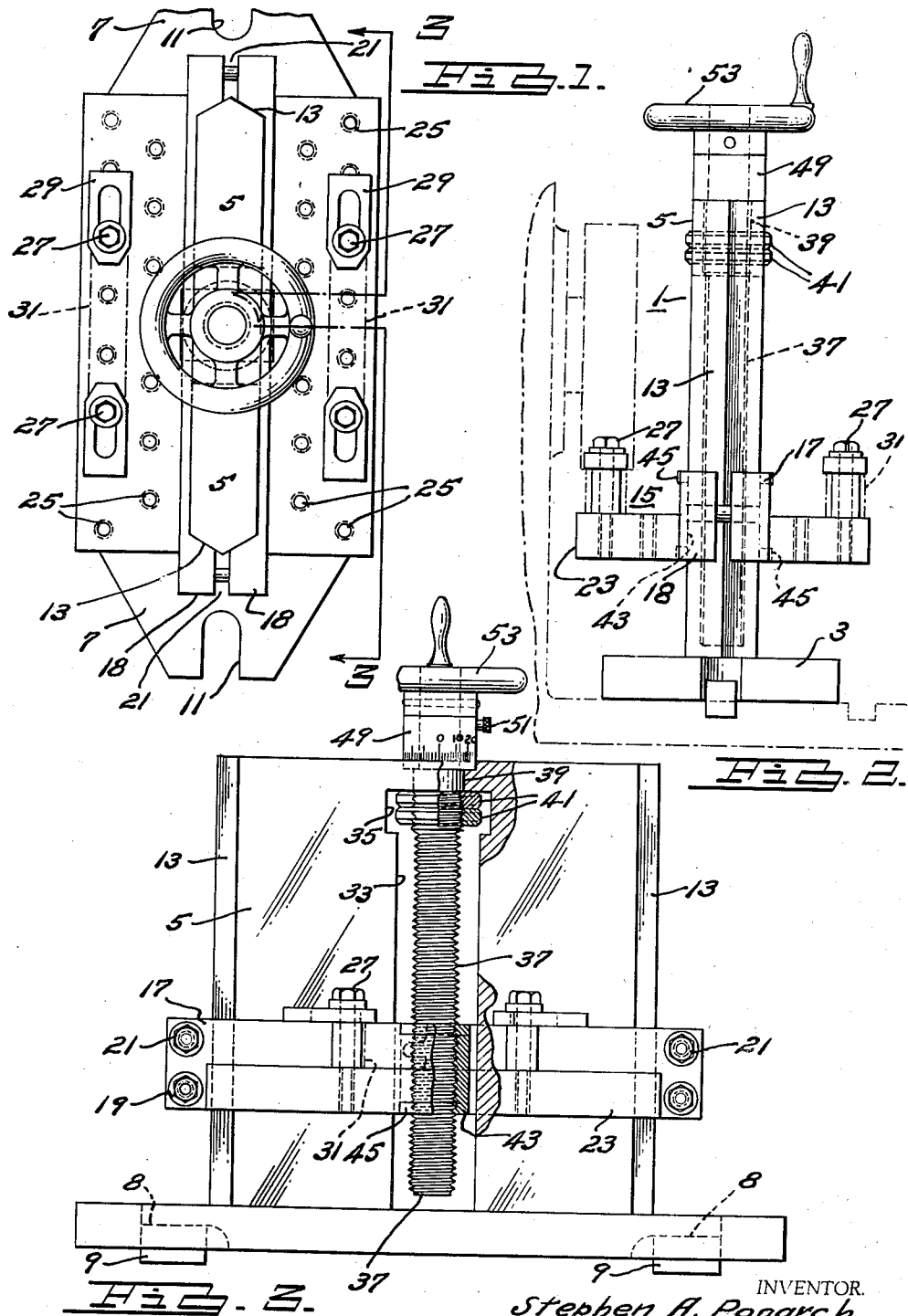

2,213,408

UNITED STATES PATENT OFFICE 2,213,408

ADJUSTABLE MICROFIXTURE FOR SPLINE MILLS

Stephen A. Pogarch, Dearborn, Mich.

Application January 18, 1940, Serial No. 314,487

5 Claims. (Cl. 90—58)

My invention pertains to work holding fixtures and more particularly to a micrometer screw adjustable fixture for adjustably supporting work on spline mills, milling machines and other metal working machines.

It is an object of my invention to provide an improved adjustable work holding fixture of a simple rugged construction which may be conveniently secured upon the table of a metal working machine, which may be accurately adjusted to move a piece of work to a predetermined position relative to the cutting tool of the machine, and which may be firmly locked without disturbing the adjustment for rigidly supporting the work in the adjusted position.

It is also an object of my invention to provide a micrometer screw adjustable work holding fixture comprising a rigid body having a slide support and a pedestal adapted for conveniently and firmly mounting the same on a machine, the slide support being substantially uniform and symmetrical in transverse cross-sections at various distances from the pedestal, a work holding slide mounted on said slide support and comprising two relatively movable parts clamped together on opposite sides of the slide support, securing means adjustable to clamp the two parts of the slide to firmly grip the slide support or releasable for moving the slide freely thereon, and means for adjusting the work holding slide consisting of a micrometer screw rotatively journalled in the slide support with one end extending from the side remote from the pedestal, a hand wheel secured on the extended end of the screw, a slot opening from the side of the slide support adjacent the micrometer screw journalled therein, and a nut threadably disposed on said screw for operatively engaging and moving the slide when the screw is rotated.

It is a further object of my invention to provide such a micrometer adjustable work supporting fixture having oppositely disposed pairs of inclined or tapering guiding and centering surfaces on the slide support, the two relatively movable parts of the slide being suitably conformed to clamp together on opposite sides of the slide support and against the inclined surfaces for accurately guiding and centering the work holding slide on the slide support, and adjustable securing means for drawing the two parts of the slide together for clamping to rigidly support the work or releasable for freely adjusting the position of the work.

Further objects and advantages are within the scope of my invention, such as relate to the arrangement operation and function of the related elements of the structure, and to economies of manufacture and numerous other features as will be apparent from a consideration of the specification in conjunction with the drawing disclosing a specific embodiment of my invention, wherein similar reference characters designate corresponding parts and underscored reference characters indicate a complete part or assembly, and in which:

Fig. 1 is a top plan view of my micrometer adjustable work holding fixture;

Fig. 2 is a side elevational view thereof; and

Fig. 3 is a front elevational view of the work holding fixture partly sectioned as indicated by the line 3—3 shown in Fig. 1.

Referring more specifically to the drawing my improved micrometer adjustable work holding fixture consists of a body 1 having a pedestal 3 and a slide support 5 rising therefrom. The fixture body 1 may be any metallic structure, or a casting or a forging having suitable strength and rigidity for this purpose. The pedestal is adapted to be conveniently and firmly secured upon the table of a spline mill, milling or other metal working machine, and for this purpose the pedestal comprises laterally extending flanges 3 and also oppositely projecting end lugs 7. The end lugs 7 are under-cut to provide grooves 8 in the bottom for receiving suitable aligning members, such as keys 9 as shown in Figs. 2 and 3, for accurately aligning the work holding fixture in a proper position on the table of the machine. Slots 11 are provided opening from the opposite ends of the end lugs 7 for the reception of suitable bolts (not shown) or any other fastening means by which the fixture may be firmly secured down on the table of any machine on which it is to be used.

The slide support 5, standing up on the pedestal, is a heavy member of sufficient thickness to have great strength and rigidity. The slide support is of a conformation having transverse cross-sections which are substantially uniform along the slide support at various distances from the pedestal. The cross-section of the slide support 5 is substantially symmetrical on both sides, front and back, and is provided with oppositely directed inclined or tapering guiding surfaces 13 for a purpose to be subsequently described.

A work holding slide 15, which is slidably disposed on the slide support, comprises two separable parts 17 suitably conformed to fit against and around opposite sides of the slide support and against the inclined guide surfaces 13 for accurately guiding and centering the slide thereon. Clamping lugs 18 project from the opposite ends of the slide parts and are provided with apertures 19 in aligned pairs for receiving suitably threaded counter sunk head screws 21 to draw the slide parts 17 together on opposite sides of the slide support 5 and the tapering guide surfaces 13. The apertures in which the screws 21 are disposed may be countersunk at the opposite ends for receiving the heads and the nuts therein to provide a symmetrical assembly free from undesirable projections.

Extending laterally from each slide part is a thick heavy work supporting shelf 23 having a plurality of threaded bolt receiving holes 25 passing vertically therethrough. The holes 25 are disposed at varying distances from the front and side of the shelf and the corresponding holes in the opposite shelves are similarly spaced. By passing suitable bolts 27 through work holding clamps 29 into a properly selected pair of holes in the work supporting shelf, any piece of work 31 may be properly located and firmly clamped thereon to be machined. When used on the spline mill the work is similarly positioned on opposite sides.

As shown in Fig. 3, a slot or recess 33 which is cut in the center of the slide support 5 is vertically elongated, rising from the pedestal and terminating at a point slightly below the upper edge of the slide support. The upper end of the vertically elongated slot 33 opens into a recess 35 which is laterally elongated. A suitably threaded micrometer screw 37 is disposed vertically in the slot 33 the upper end extending upwardly from the slide support through an aperture 39 in which the screw is rotatably journalled. A pair of lock nuts 41 are provided in threaded engagement on the micrometer screw and positioned in the broad recess 35 where the nuts are firmly locked together on the screw in a well known manner. The locked nuts by engaging the upper side of the broad recess 35 serve to restrict upward movement of the micrometer screw.

A transmission or driving nut 43 provided on the micrometer screw has laterally extending lugs 45 projecting out from the recess 33 in the slide support in opposite directions from the top and bottom of the nut to engage in slots 47 in the top and bottom of the portions of the respective slide parts adjacent the vertical slot. As the micrometer screw is rotated, the lugs 45 restrain the drive nut from rotating with the screw and also transmit forces to the two slide parts on opposite sides to drive the work supporting slide up or down accordingly as the micrometer screw is rotated.

On the upwardly projecting portion of the micrometer screw, above the slide support 5, a calibrated index dial 49 is secured, as by a thumb screw 51 by which it may be conveniently secured firmly at any desired angular position. On the upper end of the screw above the calibrated index 49 a hand wheel 53 or any suitable manually actuable member is provided for manually turning the micrometer screw to adjust the vertical position of the work piece relative to the cutter wheel of the mill.

In use the machinist places the adjustable work supporting fixture on the table of the spline mill, milling or other machine on which it is to be used, the keys or gibs serving to accurately position the fixture. By passing fastening bolts through the end slots into the table of the machine, the fixture is firmly secured thereon. The operator then places the piece or pieces of work on a shelf or on both shelves of the slide where the work is properly located and firmly secured by backing the work against the bolts which are screwed into properly selected holes 25 for drawing the clamps down. The work is then brought to an approximately suitable vertical elevation by turning the micrometer screw until spotted by the diameter or cutting edge of the tool. At that time the position of the calibrated index dial is observed. After accurately estimating the distance of the center of the cutter to the center of the hole or slot in the work, the micrometer screw is carefully turned, and by observing the calibrated dial, the work is positioned very precisely relative to the cutter so that the cut will be properly located in the work. The bolts between the two parts of the slide are tightened to clamp the slide firmly on the work support and then the machine operation is then performed on the work.

It is apparent that within the scope of the invention, modifications and different arrangements may be made other than herein disclosed, and the present disclosure is illustrative merely, the invention comprehending variations thereof.

I claim:

1. A micrometer screw adjustable work holding fixture having in combination, a body comprising a slide support and a pedestal adapted for conveniently and firmly mounting the same on a machine, said slide support being substantially uniform and symmetrical in transverse cross-sections at various distances from the pedestal, a work holding slide mounted on said slide support, oppositely directed inclined guiding surfaces on said slide support, said slide comprising two separable parts adapted to be clamped on opposite sides of the slide support and against said inclined guiding surfaces for accurately guiding and centering the slide thereon, securing means adjustable to clamp the two parts of the slide to firmly grip the slide support or releasable for moving the slide freely thereon, work holding means on said slide, a micrometer screw rotatively journalled in the slide support with one end extending from the side remote from the pedestal, a manual rotating member secured on the extended end of the screw, a calibrated index dial secured on the extended end of the micrometer screw between the manual rotating member and the slide support, a slot opening from the opposite sides of the slide support adjacent the micrometer screw, and a drive nut threadably disposed on said screw for operatively engaging and moving said slide so that the drive nut moves axially along the micrometer screw and moves the work supporting side when the screw is rotated.

2. In combination in a micrometer screw adjustable work holding fixture, a rigid body comprising a pedestal adapted for firm mounting on a machine and a slide support rising therefrom, said slide support being substantially uniform and symmetrical in a plurality of cross-sections taken transversely at various distances from the pedestal, a work supporting slide disposed for free slidable movement on said slide support, releasable securing means adjustable for clamping said slide firmly on said slide support or releasable for free slidable movement of the slide thereon, work holding means on said slide, a micrometer screw disposed for rotative movement in said body with one end extending therefrom, means restricting axial movement of said screw, means on the extended end of said micrometer screw for rotating the screw, a calibrated index dial secured on the extended end of the micrometer screw adjacent the slide support, a drive nut operatively disposed on said screw, and means operatively engaged between the drive nut and the slide to drive the slide and to restrain rotation of the nut when the micrometer screw is rotated.

3. A micrometer screw adjustable work holding fixture having in combination, a rigid body comprising a slide support and a pedestal for conveniently mounting the same firmly on a machine, said slide support being substantially uniform and symmetrical in transverse cross-sections, a work holding slide mounted on said slide support, said slide comprising two separable parts adapted to be clamped on opposite sides of the slide support, securing means adjustable to clamp the two parts of the slide to firmly grip the slide support or releasable for moving the slide freely thereon, work holding means on said slide, a micrometer screw rotatively journalled in the slide support with one end extending from the side remote from the pedestal, manual rotating means secured on the extended end of the screw, a slot opening from the opposite sides of the slide support adjacent the micrometer screw journalled therein, a drive nut threadably disposed on said screw, means extending from said drive nut and engaging the slide parts for moving said slide and for restraining rotative movement of the nut with the screw so that the nut moves axially along the screw and moves the work supporting slide when the screw is rotated.

4. A micrometer screw adjustable work holding fixture for spline mills comprising, a rigid body having a pedestal adapted for conveniently and firmly mounting the same on a machine, a slide support rising from said pedestal and of a conformation substantially uniform and symmetrical in transverse cross-sections at various distances from the pedestal, a work holding slide mounted on said slide support, said work holding slide comprising two relatively movable parts clamped together on opposite sides of the slide support, securing means adjustable to clamp the two parts of the slide to firmly grip the slide support or releasable for moving the slide freely thereon, a work holding shelf projecting laterally in opposite directions from the two parts of said slide, a plurality of spaced tapped holes in said work holding shelves, said tapped holes being spaced at various distances from either end of each shelf so that variously spaced pairs of holes may be conveniently selected and the corresponding holes being similarly disposed in both shelves, a micrometer screw rotatively journalled in the slide support for slidably moving the slide, manual rotating means for turning the screw, and a calibrated index dial associated with the screw for indicating the instant angular position of the screw.

5. In combination in a micrometer screw adjustable work holding fixture, a body comprising a pedestal and a slide support rising therefrom, said slide support being substantially uniform and symmetrical in cross-section for movably supporting a slide thereon, a work supporting slide disposed for free slidable movement on said slide support, releasable securing means adjustable for clamping said slide firmly on said slide support or releasable for free slidable movement of the slide thereon, work holding means on said slide, an elongated slot in said slide support and opening from opposite sides thereof, a micrometer screw disposed for rotative movement in said slot with one end extending through and journalled in a closed end of the slot, means restricting axial movement of said screw, manually actuable means secured on the extended end of said micrometer screw for rotating the screw, a nut operatively disposed upon the micrometer screw, and driving connection means extending from said nut and projecting from said slot on opposite sides of the slide support to operative engagement with the slide.

STEPHEN A. POGARCH.